United States Patent [19]
Sakurai et al.

[11] Patent Number: 5,172,035
[45] Date of Patent: Dec. 15, 1992

[54] CONVERGENCE SYSTEM

[75] Inventors: Soichi Sakurai, Yokohama; Masaki Nakahara, Chigasaki; Takahisa Mizuta; Nobutaka Okuyama, both of Yokohama; Michitaka Ohsawa, Fujisawa; Ichiro Niitsu, Yokohama, all of Japan

[73] Assignees: Hitachi, Ltd., Tokyo; Hitachi Mizusawa Electronics Co., Ltd., Iwate, both of Japan

[21] Appl. No.: 654,001

[22] Filed: Feb. 12, 1991

Related U.S. Application Data

[63] Continuation-in-part of Ser. No. 493,356, Mar. 14, 1990, Pat. No. 5,086,259.

[30] Foreign Application Priority Data

Feb. 13, 1990 [JP] Japan .................. 2-29619

[51] Int. Cl.⁵ .................. H01J 29/51; G09G 1/28
[52] U.S. Cl. .................. 315/368.25; 315/368.27; 315/368.28; 335/213
[58] Field of Search .............. 315/368, 368.21, 368.25, 315/368.27, 368.28; 335/213; 313/412

[56] References Cited

U.S. PATENT DOCUMENTS 3,325,675 6/1967 Sanford .................. 313/412
4,027,219 5/1977 Van Alpen et al. .................. 315/368
4,725,763 2/1988 Okuyama et al. .................. 315/368

Primary Examiner—Gregory C. Issing
Attorney, Agent, or Firm—Antonelli, Terry, Stout & Kraus

[57] ABSTRACT

A system for generating magnetic fields to converge a plurality of electron beams in a cathode-ray tube including at least one convergence yoke having a core with a ring-shaped outer periphery and a plurality of magnetic poles on an inner periphery thereof extending toward a neck part of the cathode-ray tube for forming magnetic paths therewith. A lateral line comma aberration correcting coil arrangement is provided with at least a first coil wound on at least one of the plurality of magnetic poles of the at least one convergence yoke and a first driving circuit connected to the first coil for enabling generation of a magnetic field to correct misconvergence in a lateral line direction on a fluorescent face of the cathode-ray tube, and a longitudinal line correction coil arrangement is provided with at least a second coil wound on the at least one of the plurality of magnetic poles of the at least one convergence yoke and a second driving circuit connected to the at least second coil for enabling generation of a magnetic field to correct misconvergence in a longitudinal line direction on the fluorescent face of the cathode-ray tube.

20 Claims, 8 Drawing Sheets

CONVERGENCE SYSTEM

CROSS REFERENCE TO RELATED APPLICATIONS

This application is a Continuation-in-Part application of copending U.S. application Ser. No. 493,356, filed Mar. 14, 1990, now U.S. Pat. No. 5,086,259 the subject matter of which is hereby incorporated by reference herein.

BACKGROUND OF THE INVENTION

The present invention relates to a convergence system for a cathode-ray tube having a plurality of electron guns, particularly a convergence system which is superior in focusing performance and capable of reducing the deterioration of shape of an electron beam spot during convergence correction.

According to a conventional apparatus, as described in Japanese Patent Application No. 50-27966 and the corresponding U.S. Pat. No. 3,430,099, a device for correcting misconvergence of a longitudinal line raster and a device for correcting misconvergence of a lateral line raster are attached to an electron gun of a cathode-ray tube and are separately constructed as magnetic pole pieces and convergence yokes.

In such a prior art construction, the adjustment of convergence between side beams positioned on both sides of a center beam can be made by the aforementioned convergence yokes, but it is impossible to make a convergence adjustment (coma aberration adjustment) between the center beam and the side beams. Particularly, coma aberration of lateral lines is conspicuous on a picture plane, so the correction thereof is absolutely necessary. Generally, in a color cathode-ray tube, the center beam is G (green) beam and the side beams on opposite sides of the center beam are R (red) and B (blue) beams.

In the above prior art, therefore, even in the event of occurrence of coma aberration on a picture plane due to variations in the winding distribution of a deflecting yoke or an error in the mounting position of the electron gun relative to the deflecting yoke, it is impossible to make correction to a satisfactory extent and it has so far been difficult to obtain satisfactory convergence characteristics.

SUMMARY OF THE INVENTION

It is the object of the present invention to provide a convergence system capable of enhancing the convergence adjusting function, having both an R, B convergence adjusting function and a coma aberration adjusting function in lateral and longitudinal line directions, respectively, which has heretofore not been feasible and without causing deterioration of the shape of an electron beam spot.

In order to achieve the above-mentioned object, the present invention is provided with at least one convergence yoke having a core whose outer periphery is generally annular, the convergence yoke including a lateral line coma aberration correcting coil for generating a magnetic field to correct misconvergence of both side beams relative to a center beam in a lateral line direction on the fluorescent face of a cathode-ray tube, a driving circuit for the lateral line coma aberration correcting coil, a longitudinal line correction coil for generating a magnetic field to correct longitudinal line misconvergences between both side beams on the CRT fluorescent face, and a driving circuit for the longitudinal line correction coil.

According to a feature of the convergence device of the present invention, it is possible to make convergence adjustments between both side beams in a longitudinal line direction (alignment direction of the electron guns or X direction) and a coma aberration adjustment in a lateral line direction (a direction orthogonal to the electron gun alignment direction or Y direction). Further, since the outer periphery of the core of the convergence yoke is generally annular or ring-shaped, it is possible to improve the sensitivity of the convergence yoke, diminish the leakage of magnetic field from a deflecting yoke to the electron gun, thereby remedy defocusing, and diminish misconvergence caused by the earth magnetism.

These and further objects, features and advantages of the present invention will become more obvious from the following description when taken in connection with the accompanying drawings which show for purposes of illustration only, several embodiments in accordance with the present invention.

DETAILED DESCRIPTION OF THE PREFERRED EMBODIMENTS

Figure 1A:
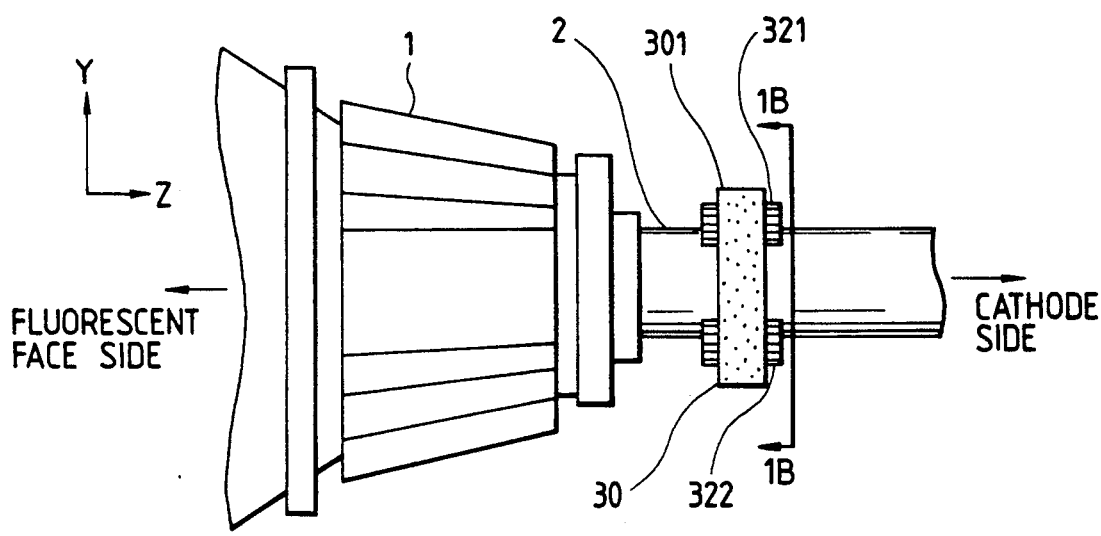
FIG. 1A is a side view of a convergence system according to an embodiment of the present invention.
Figure 1B:
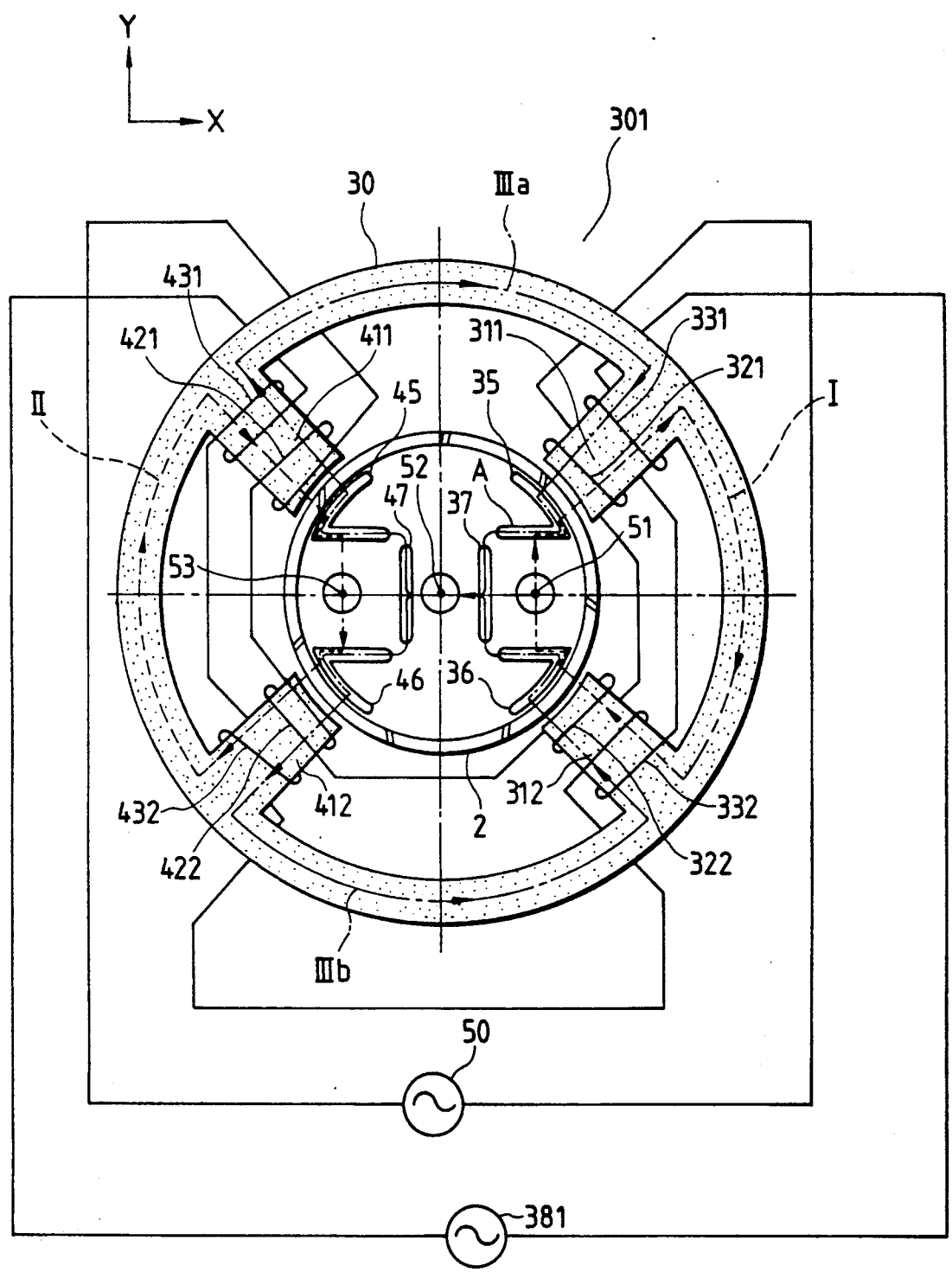
FIG. 1B is a sectional view taken on line 1B—1B in FIG. 1A.

Referring now to the drawings wherein like reference numerals are utilized to designate like parts throughout the several views, FIG. 1A is a side view of a convergence system according to an embodiment of the present invention illustrating an arrangement of a deflecting yoke and a convergence yoke for a cathode-ray tube, and FIG. 1B is a sectional view taken on line 1B—1B in FIG. 1A.

In FIG. 1A, there is shown a deflecting yoke 1 and a convergence yoke 301 disposed on a neck portion 2 of a color cathode-ray tube successively in this order from the fluorescent face side toward the cathode side. The convergence yoke 301, as shown in FIG. 1B, comprises a four-pole core 30 having an outer periphery which is generally annular or ring-shaped and having magnetic poles on an inner periphery and extending toward the neck portion, first coils 331, 332, second coils 431, 432, and third coils 321, 322, 421, 422. These coils are wound on the magnetic poles 311, 312, 411 and 412. The first coils 331 and 332 are connected in series. Likewise, the second coils 431 and 432 are connected in series, and the third coils 321, 322, 421 and 422 are also connected in series. Electron beams of R, G, B emitted by corresponding electron guns are denoted by reference numerals 51, 52 and 53 (52 denotes a center beam G, numerals 51 and 53 denote both side beams R and B, respectively). Magnetic pieces 35, 36, 37, 45, 46 and 47 of a ferromagnetic material are disposed within the neck tube 2 and convergence drive circuits 50 and 381 are provided. The first coils 331, 332 and the second coils 431, 432 are connected to the convergence drive circuit 381, while the third coils 321, 322, 421 and 422 are connected to the convergence drive circuit 50. Instead of such connection, the third coils 321, 322, 421 and 422 may be connected to a vertical deflection coil in series.

Figure 2:
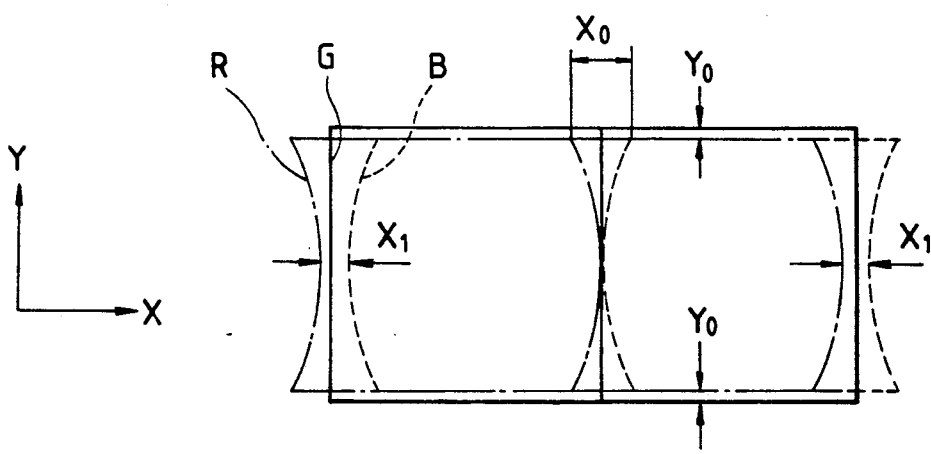
FIG. 2 illustrates misconvergence patterns.

The operation of the convergence yoke 301 will be described after a discussion of FIG. 2 which illustrates misconvergence patterns in the deflection system constructed as in FIG. 1. FIG. 2 shows raster patterns of the beams R, G and B drawn on the fluorescent face of the cathode-ray tube wherein the pattern of the side beam R (dot-dash line) and that of the side beam B (broken line) are deviated from the pattern of the center beam G (solid line). These raster patterns have a bow shape and this deviation is hereinafter referred to as bow misconvergence.

There are four kinds of misconvergence including misconvergence (Y0) between both side beams R and B with respect to the center beam G in the lateral line direction and misconvergence (X0) and (X1) between the side beams R and B in the longitudinal line direction. The misconvergence between the side beams R and B in the lateral line direction are controlled by the deflecting yoke 1.

The operation of convergence yoke 301 will now be described with reference to FIGS. 1B and 2. In FIG. 1B, a broken line I represents a magnetic field generated by the first coils 331 and 332. The magnetic field generated b the first coils 331 and 332 passes through the outer peripheral portion of the four-pole core 30, enters the magnetic piece 36 from the front end of the magnetic pole 312, then passes through the magnetic pieces 37 and 35, and again enters the outer peripheral portion of the four-pole core 30. Likewise, a magnetic field II, also shown in broken line, generated by the second coils 431 and 432 passes through the outer peripheral portion of the four-pole core 30, enters the magnetic piece 45 from the front end of the magnetic pole 411, then passes through the magnetic pieces 47 and 46 and again enters the core 30.

Therefore, in the vicinity of the electron beam R 51 and electron beam B 53 of the convergence yoke 301, the magnetic fields indicated by the broken lines I and II comprise only Y-axis components travelling in directions opposite to each other. Thus, the misconvergences X0 and X1 shown in FIG. 2 can be corrected by adjusting the magnetic fields I and II in the convergence yoke 301.

Further, in FIG. 1B, a dot-dash line IIIa represents a magnetic field generated by the third coils 321 and 421, while a dot-dash line IIIb represents a magnetic field generated by the third coils 322 and 422. The magnetic field IIIa generated by the third coils 321 and 421 passes through the upper outer periphery of the four-pole core 30, enters the magnetic pieces 35 and 37 from the front end of the magnetic pole 311, then passes through the magnetic pieces 47 and 45 and again enters the core 30 at the front end of the magnetic pole 411. Likewise, the magnetic field IIIb generated by the third coils 322 and 422 passes through the lower outer periphery of the four-pole core 30, enters the magnetic pieces 36 and 37 from the front end of the magnetic pole 312, then passes through the magnetic pieces 47 and 46 and again enters the core 30 at the front end of the magnetic pole 412.

Therefore, the magnetic fields IIIa and IIIb scarcely act on the electron beams R 51 and B 53 due to the presence of the magnetic pieces 35 and 36, and essentially act on only the electron beam G 52 as a magnetic field in the X-axis direction because of the presence of the magnetic pieces 37 and 47. In other words, the magnetic fields indicated by the dot-dash lines can correct the misconvergence Y0 in FIG. 2 (at the upper and lower portions of the patterns).

The bottom portions A (FIG. 1B) of the magnetic pieces 35, 36, 45 and 46 have shapes which extend in parallel to the X axis, and the magnetic pieces 37 and 47 have shapes which extend in parallel to the Y axis so that the convergence correcting magnetic fields indicated by the broken lines and dot-dash lines are almost uniform near the electron beams 51, 52 and 53 (R, G and B). This means that notwithstanding the convergence correction, it is possible to maintain a superior focusing performance without deterioration of the electron beam spots.

Figure 3:
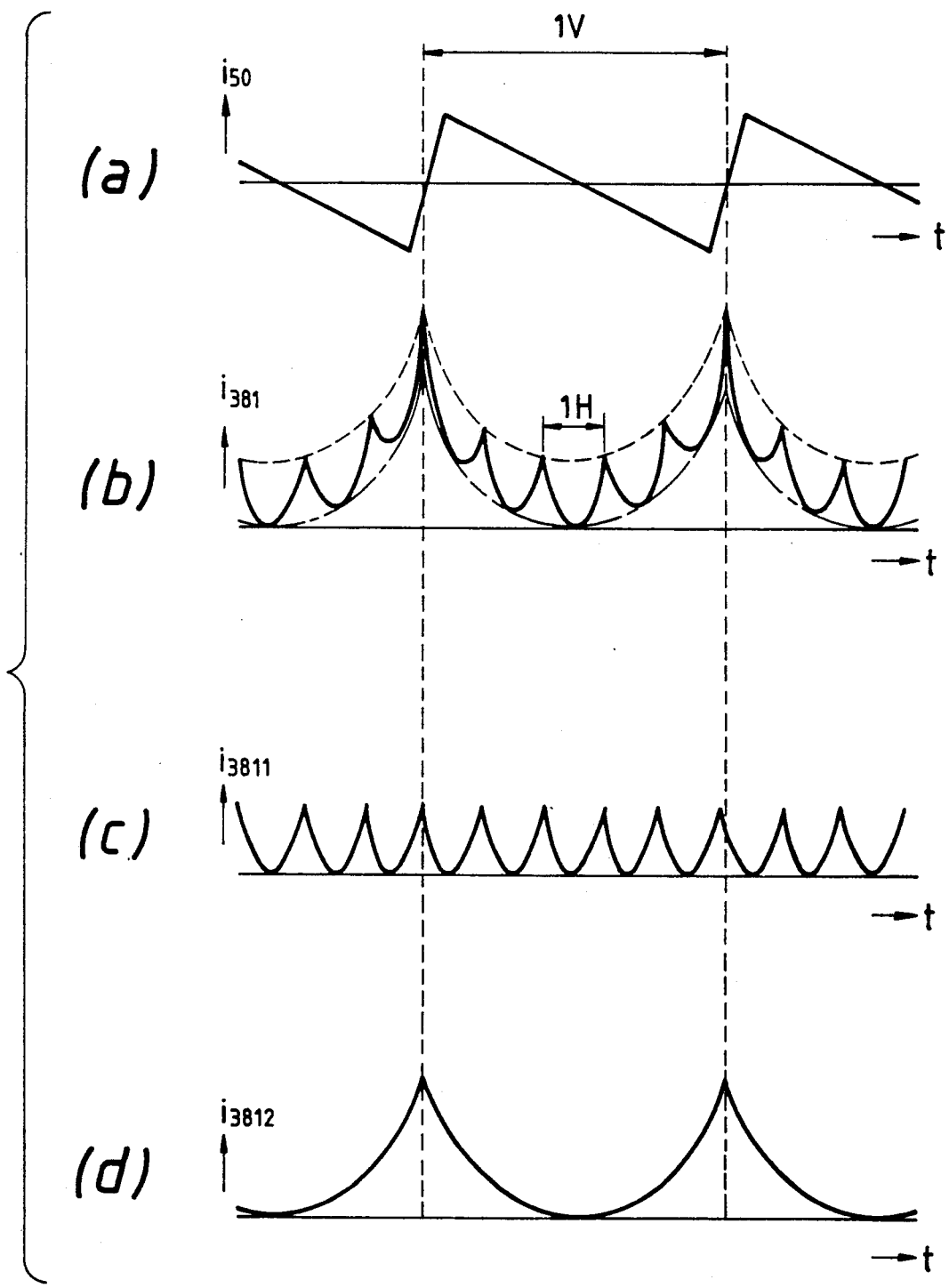
FIG. 3 shows current waveforms (a)-(d) in accordance with embodiments of the present invention.

The convergence drive circuits 50 and 381 generate electric currents synchronized with horizontal and vertical deflection periods. For example, the circuits 50 and 381 can be constituted by a digital convergence circuit having a digital memory and capable of generating a desired correction waveform, or an analog circuit capable of generating a correction wave form such as a resonant waveform or an integral or differential waveform of a horizontal or vertical pulse voltage. For example, the convergence drive circuit 381 generates a vertical, substantially parabolic wave current modulated at a vertical period and a horizontal, substantially parabolic wave current modulated at a horizontal period as shown by current i381 in waveform (b) of FIG. 3, while the convergence drive circuit 50 produces the same current waveform as the vertical deflecting current waveform as shown by current i50 in waveform (a) of FIG. 3.

Figure 4:
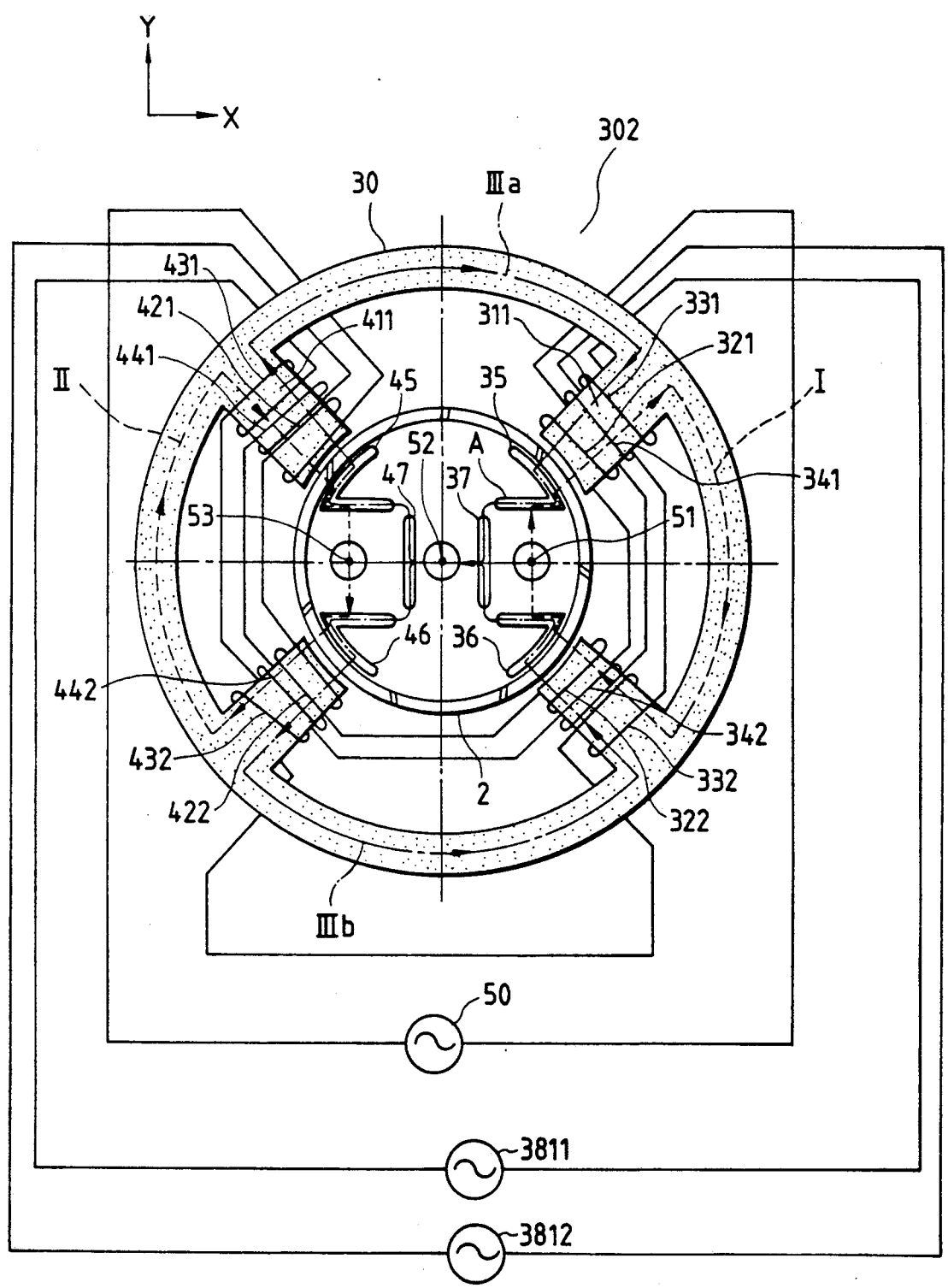
FIG. 4 is a sectional view of a convergence system according to another embodiment of the present invention.

FIG. 4 illustrates a convergence system according to another embodiment of the present invention corresponding to the sectional view of FIG. 1B with the portions performing the same functions being indicated by the same reference numerals. A prime feature of the embodiment illustrated in FIG. 4 resides in dividing the correction of the misconvergences X0 and X1, in FIG. 2, in such a manner that the misconvergence X1 is corrected by the first coils 331, 332 and the second coils 431, 432 wound on the poles of a convergence yoke 302, while the misconvergence X0 is corrected by additional fourth coils 341, 342, 441 and 442. In FIG. 4, the first coils 331, 332 and the second coils 431, 432 are connected to a horizontal parabolic wave generating circuit 3811, so that an electric current i3811 of a horizontal, substantially parabolic wave current as shown in waveform (c) of FIG. 3 flows through such coils, while the fourth coils 341, 342, 441 and 442 are connected to a vertical parabolic wave generating circuit 3812, so that a vertical, substantially parabolic wave current i3812 as shown in waveform (d) of FIG. 3 flows through the fourth coils.

Figure 5A:
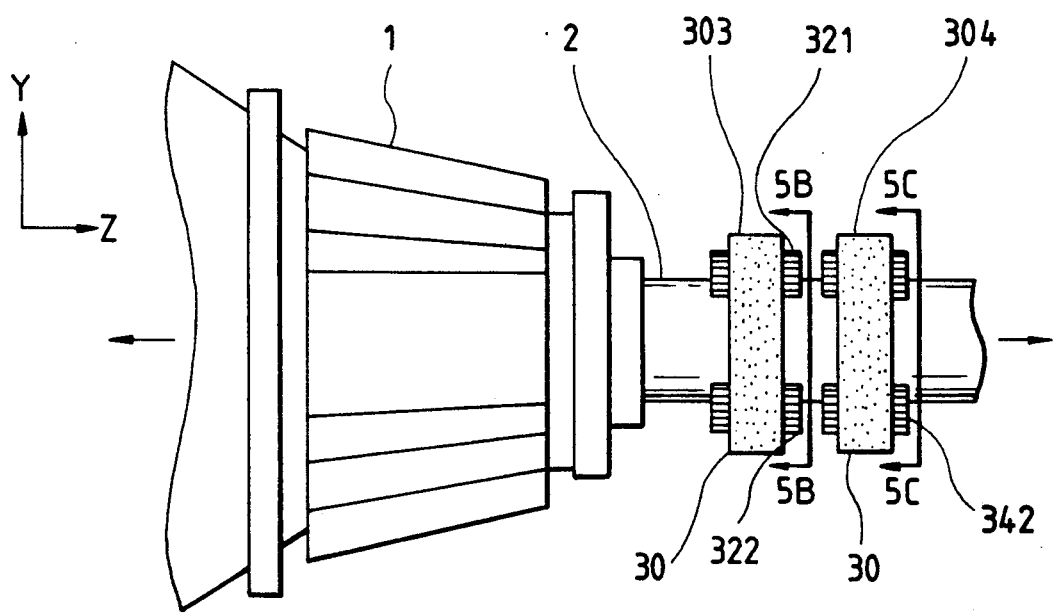
FIGS. 5A to 5C are a side view and sectional views of a convergence system according to a further embodiment of the present invention.
Figure 5B:
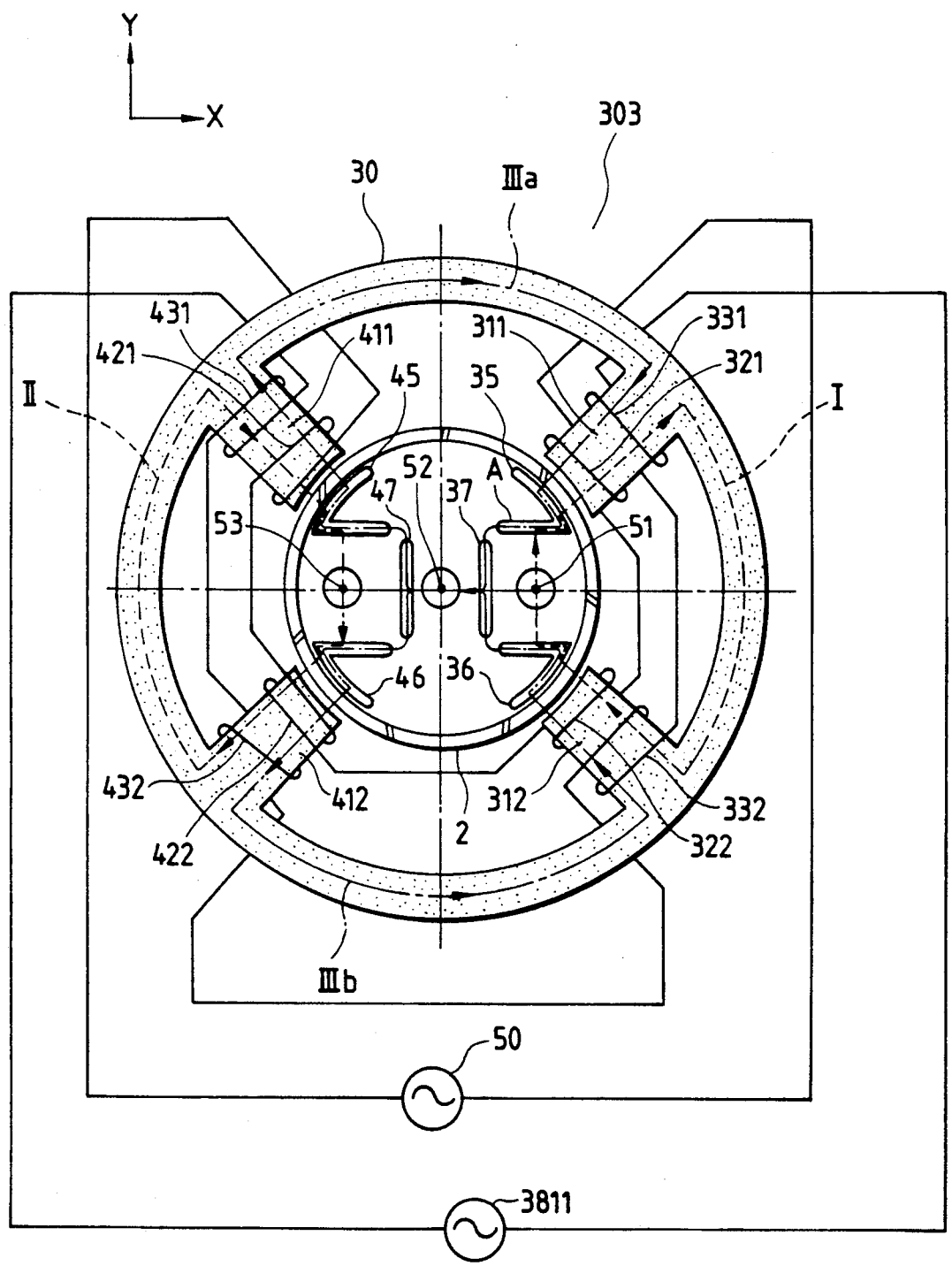
Figure 5C:
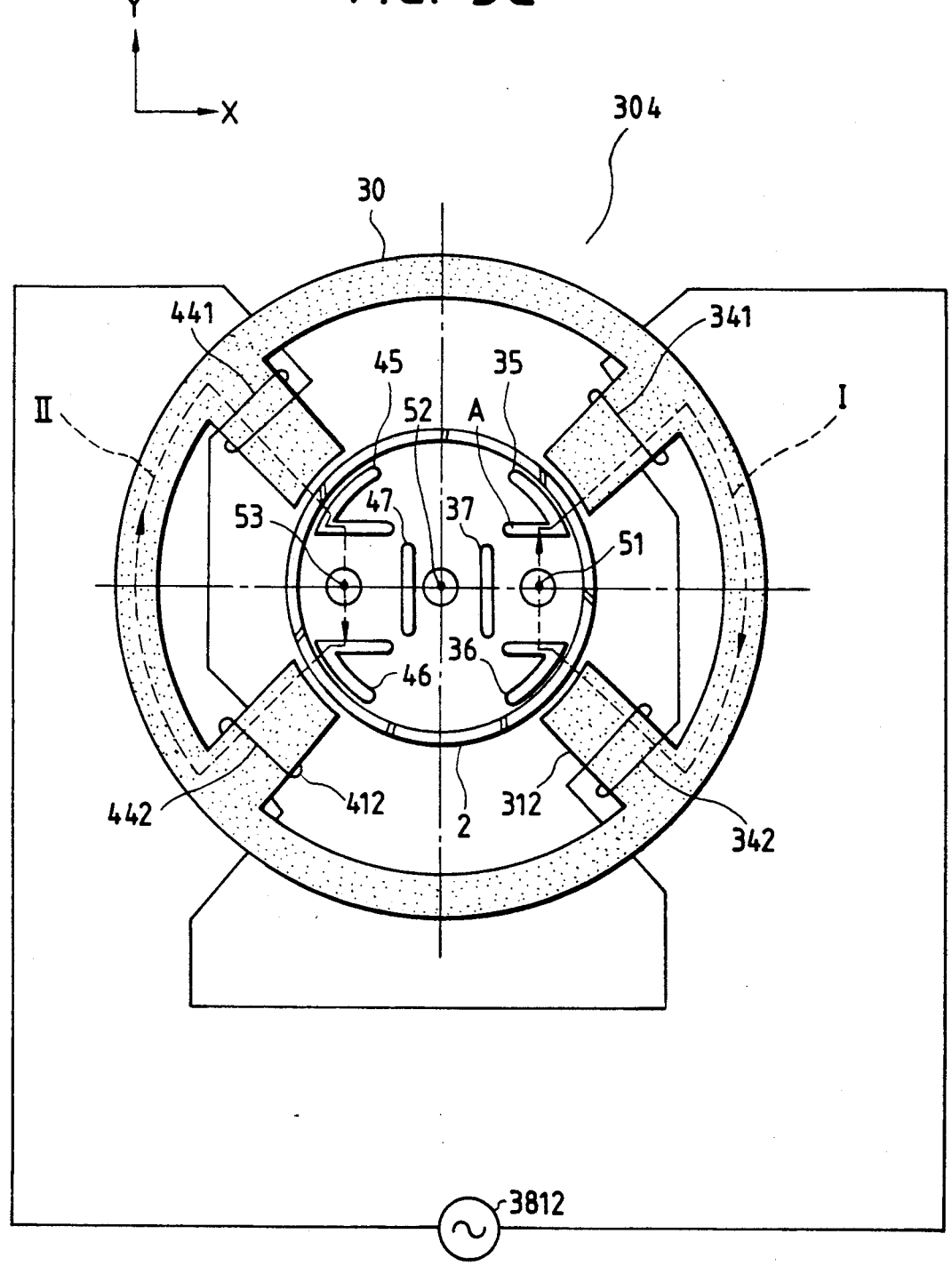

FIG. 5 illustrates a convergence system according to a further embodiment of the present invention, in which FIG. 5A is a side view showing an arrangement of a deflecting yoke and convergence yokes, and FIGS. 5B and 5C are sectional views taken on lines 5B—5B and 5C—5C, respectively, in FIG. 5A. A prime feature of the embodiment illustrated in FIG. 5 resides in using two sets of convergence yokes 303 and 304. As shown in FIG. 5B, the first coils 331, 332 and the second coils 431, 432 are provided in the first convergence yoke 303, while the fourth coils 341, 342, 441 and 442 are provided in the second convergence yoke 304, as shown in FIG. 5C. This construction is advantageous in reducing the interference between the horizontal parabolic wave generating circuit 3811 and the vertical parabolic wave generating circuit 3812.

The horizontal parabolic wave generating circuit 3811 and the vertical parabolic wave generating circuit 3812 described in the above embodiments may be digital convergence circuits.

Figure 6:
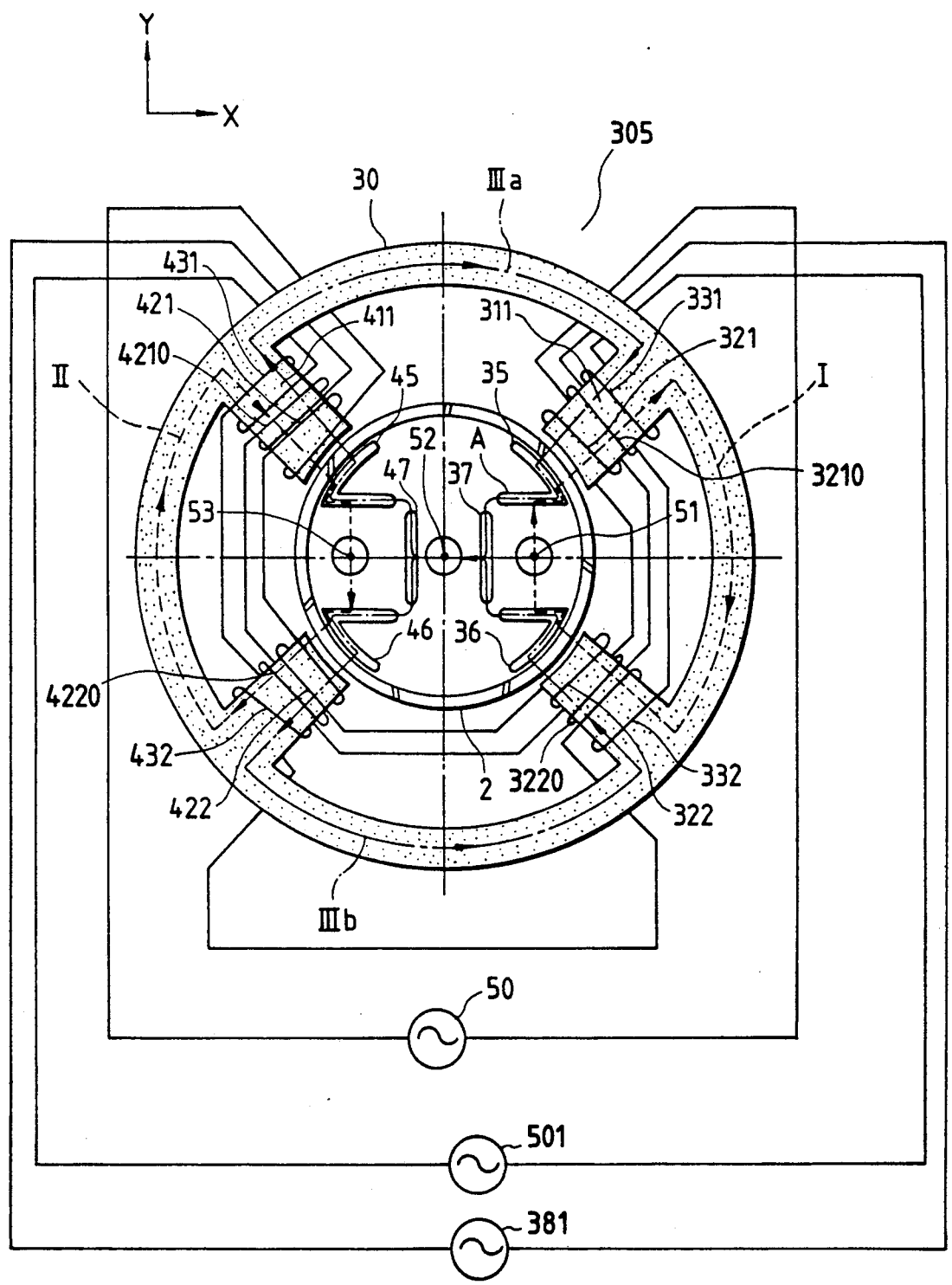
FIG. 6 is a sectional view of another embodiment of the present invention.

FIG. 6 illustrates a side view of another embodiment of the present invention corresponding to a modification of FIG. 1B, for example. In this embodiment, fifth coils 3210, 3220, 4210 and 4220 are provided and wound on a respective pole of a convergence yoke 305 and connected in series to a vertical sawtooth wave generating circuit 501. In this construction, the misconvergence Y0 is connected not only by the third coils 321, 322, 421, 422, but also by the fifth coils 3210, 3220, 4210, 4220, which is advantageous in reducing total power loss of the sawtooth wave generating circuit 501 and the convergence drive circuit 50. Additionally, in the above-described embodiments, the third coils 321, 322, 421 and 422 may be connected to a vertical deflection coil in series instead of the connection described.

Even if the magnetic pieces 35, 36, 45, 46, 37 and 47 mounted in the interior of the neck tube 2 shown in FIGS. 1, 4–6 are omitted, there will be attained the same misconvergence correcting functions as in the embodiments illustrated in FIGS. 1, 4–5, although the sensitivity of the convergence yoke 301 and electron beam spots may be deteriorated to some extent.

According to the present invention, high-accuracy convergence performance can be realized over the whole area of the picture plane because it is possible to correct misconvergences in the longitudinal and lateral line directions between both side beams (R, B). Also, a higher-accuracy convergence performance can be realized by using separate drive circuits capable of generating desired current wave forms synchronized with horizontal and vertical synchronizing signals. Further, since the outer periphery of the core of the convergence yoke is generally annular or ring-shaped, it is possible to improve the sensitivity of the convergence yoke, diminish the leakage of magnetic field from the deflecting yoke to the electron gun, thereby remedy defocusing, and diminish misconvergence caused by the earth magnetism.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A system for generating convergence correction magnetic fields to a center beam and two side beams emitted from electron guns in a cathode-ray tube comprising:

at least one convergence yoke having a core with a ring-shaped outer periphery and a plurality of magnetic poles on an inner periphery thereof extending toward a neck part of the cathode-ray tube for forming magnetic paths therewith;

lateral line comma aberration correcting coil means including at least a first coil wound on the plurality of magnetic poles of the at least one convergence yoke and a first driving circuit connected to the first coil for enabling generation of a magnetic field for acting substantially only on the center beam to correct misconvergence in a lateral line direction on a fluorescent face of the cathode-ray tube; and longitudinal line correction coil means including at least a second coil wound on the plurality of magnetic poles of the at least one convergence yoke and a second driving circuit connected to the at least second coil for enabling generation of a magnetic field for acting substantially only on the side beams to correct misconvergence in a longitudinal line direction on the fluorescent face of the cathode-ray tube.

2. A system according to claim 1, further comprising first and second magnetic pieces disposed within the neck part of the cathode-ray tube and cooperating with the at least one convergence yoke for forming magnetic paths, the first magnetic pieces cooperating with the lateral line comma aberration correction coil means and the second magnetic pieces cooperating with the longitudinal line correction coil means.

3. A system according to claim 2, wherein the lateral line coma aberration correction coil means enables generation of a magnetic field to correct misconvergence of the two side beams relative to the center beam in the lateral line direction orthogonal to the longitudinal line direction, the longitudinal line correction coil means enabling generation of the magnetic field to correct misconvergence in the longitudinal line direction between the two side beams on the fluorescent face of the cathode-ray tube.

4. A system according to claim 2, wherein the first magnetic pieces extend in parallel to the lateral line direction of the center beam and the second magnetic pieces have parts extending in parallel to the longitudinal line direction.

5. A system according to claim 3, wherein the lateral line coma aberration correction coil means includes the at least first coil wound on each of the plurality of magnetic poles of the at least one convergence yoke and connected to the series connection of the firs coils, the longitudinal line correction coil means includes at least the second coil wound on each of the plurality of magnetic poles of the at least one convergence yoke and connected in series, the second driving circuit being connected to the series connection of the second coils.

6. A system according to claim 5, wherein the series connection of the first coils is connected to a vertical deflection coil.

7. A system according to claim 5, wherein the first driving circuit provides a current having a waveform corresponding to a vertical deflecting current waveform to the series connected first coils.

8. A system according to claim 5, wherein the second driving circuit includes a parabolic waveform generator.

9. A system according to claim 5, wherein the longitudinal line correction coil means includes a third coil wound on each of the plurality of magnetic poles of the at least one convergence yoke and connected in series and a third driving circuit connected to the series connection of the third coils for enabling generation of a magnetic filed to correct misconvergence in the longitudinal line direction on the fluorescent face of the cathode-ray tube, the second driving circuit includes one parabolic waveform generator, and the third driving circuit includes another parabolic waveform generator.

10. A system according to claim 5, further comprising another convergence yoke having a core with a ring-shaped outer periphery and a plurality of magnetic poles on an inner periphery thereof extending toward the neck part of the cathode-ray tube having the ferromagnetic pieces therein for forming magnetic paths therewith, the another convergence yoke being disposed adjacent to the at least one convergence yoke, the longitudinal line correction coil means further including a third coil wound on each of the plurality of magnetic poles of the another convergence yoke and connected in series, and a third driving circuit connected to the series connection of the third coils for enabling generation of a magnetic field to correct misconvergence in the longitudinal line direction on the fluorescent face of the cathode-ray tube.

11. A system according to claim 10, wherein the second driving circuit includes one parabolic waveform generator, and the third driving circuit includes another parabolic waveform generator.

12. A system according to claim 5, wherein the at least one convergence yoke has four magnetic poles.

13. A system according to claim 9, wherein the at least one convergence yoke has four magnetic poles.

14. A system according to claim 4, wherein the second magnetic pieces include parts extending circumferentially along the ring-shaped core at positions opposite to each of the plurality of magnetic poles.

15. A system according to claim 10, wherein the another convergence yoke has four magnetic poles.

16. A system according to claim 5, wherein the lateral line coma aberration correcting coil means includes a third coil wound on each of the plurality of magnetic poles of the at least one convergence yoke and connected in series and a third driving circuit connected to the series connection of the third coils for enabling generation of a magnetic field to correct misconvergence of the two side beams relative to the center beam in the lateral line direction.

17. A system according to claim 16, wherein the third driving circuit is a vertical sawtooth wave generating circuit providing a current having a vertical sawtooth waveform to the series connection of the third coils.

18. A system according to claim 17, wherein the second driving circuit includes a parabolic waveform generator.

19. A system according to claim 18, wherein the series connection of the first coils is connected to a vertical deflection coil.

20. A system according to claim 17, wherein the at least one convergence yoke has four magnetic poles.

* * * * *